Figure 1:
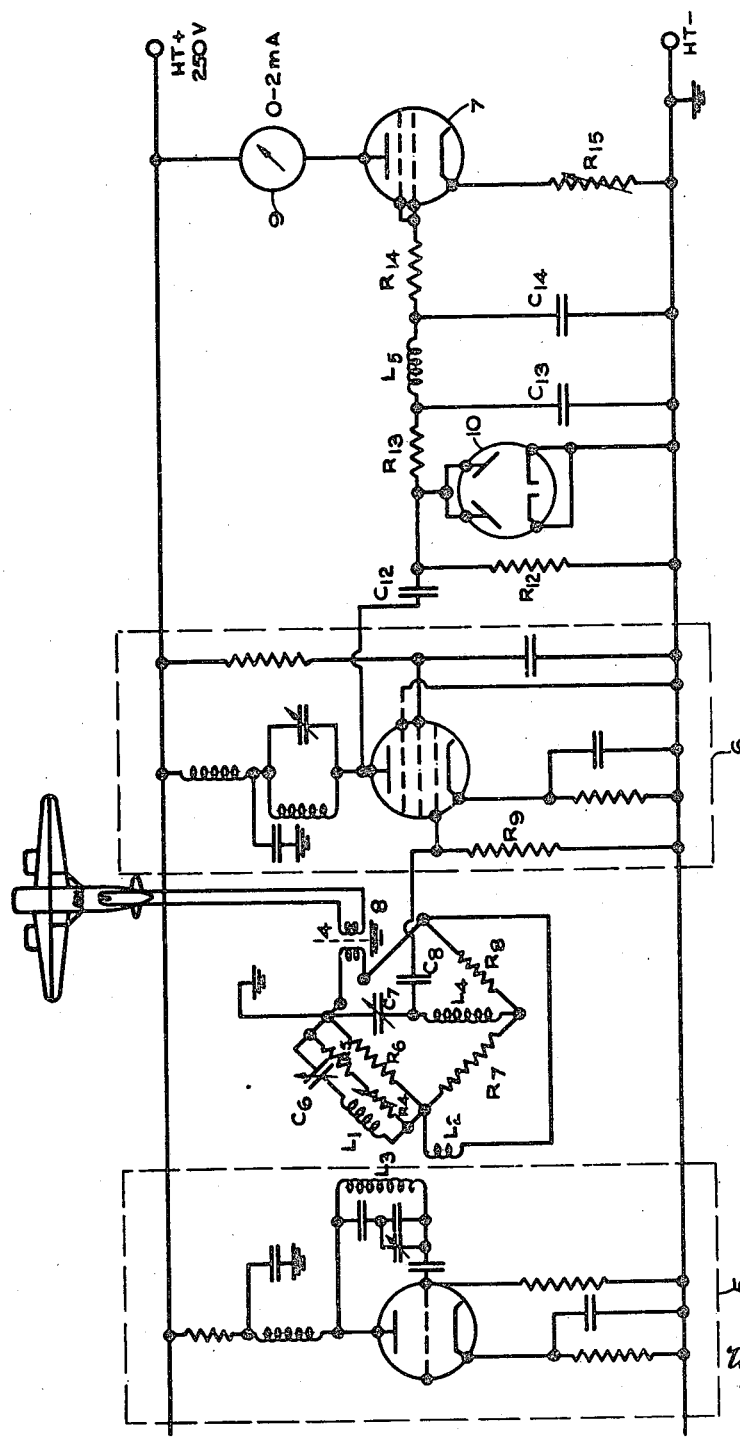

Patented Mar. 29, 1949

2,465,723

UNITED STATES PATENT OFFICE 2,465,723

RADIO WAVE ALTIMETER

Douglas Max Heller, Wembley, England, assignor to The General Electric Company Limited, London, England Application May 6, 1943, Serial No. 485,791
In Great Britain May 6, 1942

11 Claims. (Cl. 343—12)

This invention relates to blind-landing devices for aircraft of the type comprising means for determining the distance of the craft from the ground when that distance is so small that known devices actuated by barometric pressure are ineffective. This limit may be set at about 10 metres. This object is achieved according to the invention by using the variation in the impedance of a radiating aerial with its distance from a plane that is conducting or of a dielectric constant different from that of the medium immediately surrounding the aerial.

According to the invention a blind-landing device for aircraft of the type specified comprises an aerial, preferably a doublet, fed with high frequency radio oscillations from an oscillator and measuring means for determining continuously the variations in impedance of the aerial as the aircraft approaches the ground. The measuring means comprises a bridge of which one diagonal is fed with oscillations from the said oscillator; the said aerial is connected in one arm of the bridge; the other arms are adjusted so that the bridge is balanced when the aerial is very distant from the ground; and an instrument measures the out-of-balance current or voltage in the other diagonal of the bridge. This current or voltage, subject to certain conditions, is a measure of the distance of the aerial from the ground. The instrument may be calibrated directly in distances.

It is to be understood (1) that the statement that the aerial "is connected in" one arm of the bridge means no more than that the impedance of this arm bears a one-one relation to the impedance of the aerial; thus the aerial may be coupled inductively to the arm and the arm may contain a fixed impedance independent of the aerial. (2) The statement that the instrument is in the diagonal and measures the out-of-balance current or voltage means no more than that the reading of the instrument bears a one-one relation to that current; thus the out-of-balance voltage may be rectified and amplified before it is applied to the instrument.

The wavelength of the oscillations radiated from the aerial should be not less than four times the least distance from the ground at which a reliable indication is essential; for when the distance from the ground exceeds a quarter of a wavelength successive maxima and minima occur in the impedance of the aerial as the distance increases, owing to the variation in phase of the ground reflected wave picked up by the aerial, and the indication of the instrument will not be reliable. The device according to the invention should therefore be associated with a device of some other kind (for example the barometric kind) which is reliable at the larger distances. A warning must be given to the operator that he is not to regard the readings of the bridge instrument beyond the range over which it is reliable, or automatic means provided that prevent him from doing so.

On the other hand the wavelength should be as small as possible for optimum sensitivity; a suitable wavelength would be about 30 to 60 metres and oscillations having wavelengths of this order, i. e., frequencies of several megacycles, is what is meant in this specification and in the appended claims by "high frequency oscillations."

The length of the aerial should be comparable with the wavelength and since its distance from the ground should be approximately the same along its length, the aerial should be substantially horizontal. It is usually convenient that it should be stretched along the wings of the aircraft.

Again, since the effect of a given approach to the ground on the impedance of the aerial varies somewhat with the nature of the ground, it may be necessary to adjust the scale of the measuring instrument according to the particular landing ground that is being approached. This problem may be solved on the same known principles as the adjustment of a barometric altitude-meter to the pressure at ground level.

Figure 2:
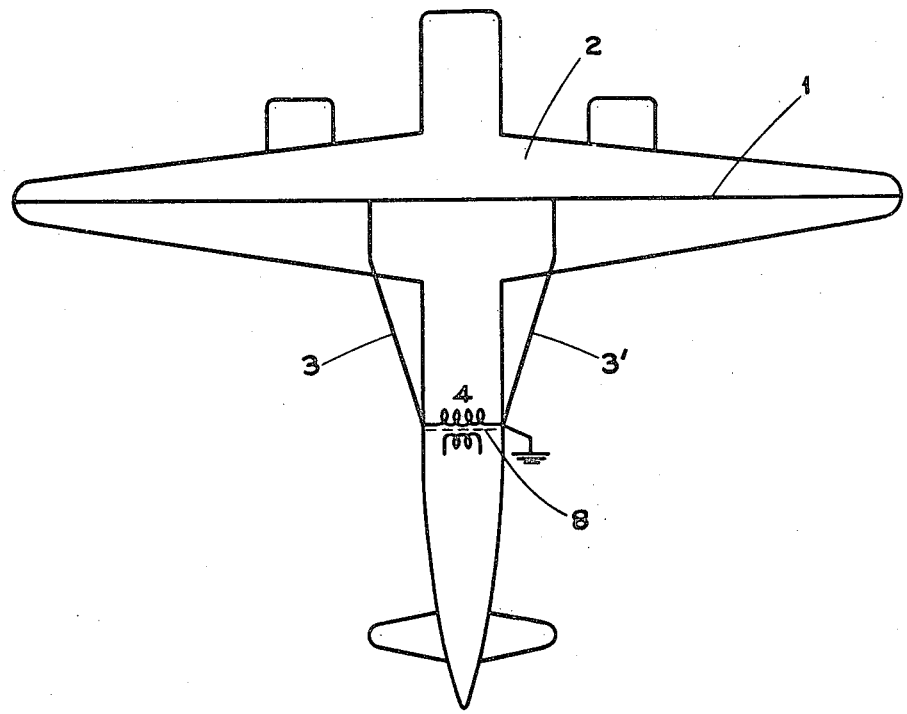

The characteristic elements of one embodiment of the invention will now be described, by way of example, with reference to Figure 1 of the accompanying drawing. It is adapted to operate at a frequency of 9 mc./s., or a wavelength of 33.3 metres. Figure 2 shows how the aerial and its connections are arranged on the aeroplane.

I is the doublet aerial, having a total length of some 20 metres, stretched along the wings 2 (Figure 2) of the aircraft. Alternatively the skin of the wings may be used as the aerial. Leads 3, 3', connect points 2 m. from the centre of the aerial to the ends of the primary of a transformer 4 whose secondary forms one arm of the bridge; primary and secondary are separated by the earthed screen 8. This transformer connection enables a point on the bridge to be earthed although the aerial is balanced with respect to earth.

The other arms of the bridge are the resistors $R_7$, $R_8$ and the series tuned circuit $L_1$, $C_6$, which is shunted by the fixed resistor $R_6$ and by the resistors $R_4$, $R_5$ in series, of which $R_4$ is variable.

The bridge is balanced when the aircraft is far from the ground by variation of $R_4$.

The bridge is fed with radio oscillations through a transformer whose secondary $L_2$ forms one diagonal of the bridge and whose primary is an inductor $L_3$ forming part of the tuning circuit of an oscillator enclosed in the dotted rectangle 5. This oscillator is of conventional design, and its construction will be obvious to experts. The other diagonal, in which the out-of-balance voltage is developed, is a series tuned circuit $C_7$, $L_4$, tuned to 9 mc./s.

The voltage developed across $C_7$, which is of course considerably greater in amplitude than the voltage across the whole diagonal, is applied through the condenser $C_8$ to the tuned radio frequency amplifier contained in the dotted rectangle 6. This amplifier has a single pentode valve and is of the kind conventionally used in broadcast reception.

The output of the amplifier 6 requires rectification and further amplification before it is applied to the reading instrument. In order to avoid feed-back and other troubles, the rectification precedes the amplification. The output of the amplifier is fed through the condenser $C_{12}$ to the anodes of a diode rectifier 10, shunted by the resistor $R_{12}$. The voltage developed across $R_{12}$ is applied through the smoothing arrangement ($R_{13}$, $R_{14}$, $L_5$, $C_{13}$, $C_{14}$) to the grid of a triode 7, in whose anode circuit lies the D. C. milliammeter 9 reading up to 2 ma. The cathode of the triode 7 is earthed through the variable resistor $R_{15}$.

The current through the milliammeter is a maximum when the bridge is balanced, and the aircraft is far from the ground. This reading is made to coincide with a fiducial mark by adjusting the resistor $R_{15}$. As the ground is approached, the current decreases. If $d$ is the distance from the ground, it is usually found that the current for all values of $d$ $\lambda/4$ is greater than the current for some value of $d$ not much less than $\lambda/4$; the part of the ammeter scale adjacent to the fiducial mark and up to that corresponding to this value of $d$ can then be obscured and the remainder alone marked in distances less than $\lambda/4$. The aforesaid "automatic warning" is thereby provided.

The following values are appropriate for the chief components aforementioned:

$L_1$, 4.15 μh.  
$L_2$, less than 0.5 μh.  
$L_4$, 4.15 μh.  
$R_4$, 1000 ω (variable)  
$R_5$, 250 ω (fixed)  
$R_6$, 75 ω (fixed)  
$R_7$, 75 ω (fixed)  
$R_8$, 75 ω  
$C_8$ 100 pf. (variable)  
$C_7$, 70 pf. (variable)  
$C_8$, 100 pf. (fixed)  
$C_{12}$, 1000 pf. (fixed)  
$R_9$, 100 000 ω (fixed)  
$R_{12}$, 250,000 ω (fixed)  
$R_{15}$, 1000 ω (variable)  
Valve 7. mutual conductance 3 ma./v.

Having thus described my invention, I claim as new and desire to secure by Letters Patent:

1. A blind-landing device for use in an aircraft of the character described, said device being adapted to determine the distance from the ground of the aircraft when the latter is at low altitudes, said device comprising an aerial mounted on the aircraft, an oscillator for feeding said aerial, and measuring means for determining continually at low altitudes the change in impedance of said aerial, as it emits oscillations, from the impedance of said aerial at a point very distant from the ground, said measuring means including an impedance bridge, in one arm of which the aerial is connected and a diagonal of which is fed by the oscillator, another arm of said bridge being adjustable so that the bridge can be balanced when the aircraft is very distant from the ground, the other diagonal of the bridge having an instrument for measuring the degree to which the bridge is out of balance.

2. A blind-landing device for use in an aircraft of the character described, said device being adapted to determine the distance from the ground of the aircraft when the latter is at low altitudes, said device comprising an aerial mounted on the aircraft, an oscillator for feeding said aerial, and measuring means for determining continually at low altitudes the change in impedance of said aerial, as it emits oscillations, from the impedance of said aerial at a point very distant from the ground, said measuring means including an impedance bridge, in one arm of which the aerial is connected and a diagonal of which is fed by the oscillator, another arm of said bridge comprising a variable resistance so that the bridge can be balanced when the aircraft is very distant from the ground, the other diagonal of the bridge having an instrument for measuring the degree to which the bridge is out of balance.

3. A blind-landing device for use in an aircraft of the character described, said device being adapted to determine the distance from the ground of the aircraft when the latter is at low altitudes, said device comprising an aerial mounted on the aircraft, an oscillator for feeding said aerial, and measuring means for determining continually at low altitudes the change in impedance of said aerial, as it emits oscillations, from the impedance of said aerial at a point very distant from the ground, said measuring means including an impedance bridge, in one arm of which the aerial is connected and a diagonal of which is fed by the oscillator, another arm of said bridge comprising a variable resistance and a tuned circuit including a capacitance and an inductance so that the bridge can be balanced when the aircraft is very distant from the ground, the other diagonal of the bridge having an instrument for measuring the degree to which the bridge is out of balance.

4. A blind-landing device for use in an aircraft of the character described, said device being adapted to determine the distance from the ground of the aircraft when the latter is at low altitudes, said device comprising an aerial mounted on the aircraft, an oscillator for feeding said aerial, and measuring means for determining continually at low altitudes the change in impedance of said aerial, as it emits oscillations, from the impedance of said aerial at a point very distant from the ground, said measuring means including an impedance bridge, in one arm of which the aerial is connected and a diagonal of which is fed by the oscillator, another arm of said bridge comprising a variable resistance and a tuned circuit including a series connected capacitance and inductance so that the bridge can be balanced when the aircraft is very distant from the ground, the other diagonal of the bridge having an instrument for measuring the degree to which the bridge is out of balance.

5. A blind-landing device for use in an aircraft of the character described, said device being adapted to determine the distance from the ground of the aircraft when the latter is at low altitudes, said device comprising an aerial mounted on the aircraft, an oscillator for feeding said aerial, and measuring means for determining continually at low altitudes the change in impedance of said aerial, as it emits oscillations, from the impedance of said aerial at a point very distant from the ground, said measuring means including an impedance bridge, in one arm of which the aerial is connected and a diagonal of which is fed by the oscillator, another arm of said bridge comprising a variable resistance and a tuned circuit including a series connected capacitance and inductance shunting said variable resistance so that the bridge can be balanced when the aircraft is very distant from the ground, the other diagonal of the bridge having an instrument for measuring the degree to which the bridge is out of balance.

6. A blind-landing device for use in an aircraft of the character described, said device being adapted to determine the distance from the ground of the aircraft when the latter is at low altitudes, said device comprising an aerial mounted on the aircraft, an oscillator for feeding said aerial, and measuring means for determining continually at low altitudes the change in impedance of said aerial, as it emits oscillations, from the impedance of said aerial at a point very distant from the ground, said measuring means including an impedance bridge, in one arm of which said aerial is connected, an oscillator for feeding one diagonal of said bridge, another arm of said bridge being adjustable so that the bridge can be balanced when the aircraft is very distant from the ground, a tuned circuit in the other diagonal of said bridge, said circuit being resonant at the frequency of oscillations generated by said oscillator, and an instrument fed from said tuned circuit for measuring the degree to which the bridge is out of balance.

7. A blind landing device for use in an aircraft for indicating the distance of the aircraft from the ground when close to the ground, said device comprising means for generating high frequency radio oscillations, an impedance bridge, means for applying said oscillations across one diagonal of said bridge, a doublet aerial connected in one arm of said bridge, the other arms of the said bridge being adjusted so that the bridge is balanced when the aircraft is very distant from the ground, and an instrument connected in the other diagonal of the said bridge for measuring the out-of-balance current or voltage developed on the said other diagonal when the aircraft is close to the ground.

8. A blind landing device for use in an aircraft for indicating the distance of the aircraft from the ground when close to the ground, said device comprising means for generating high frequency radio oscillations, an impedance bridge, means for applying said oscillations across one diagonal of said bridge, a doublet aerial connected in one arm of said bridge, the other arms of the said bridge being adjusted so that the bridge is balanced when the aircraft is very distant from the ground, a series tuned circuit resonant to said oscillations connected in the other diagonal of said bridge, and an instrument connected to measure the voltage developed across the inductance or capacity of said series tuned circuit when the aircraft is close to the ground.

9. A blind landing device for use in an aircraft for indicating the distance of the aircraft from the ground when close to the ground, said device comprising means for generating high frequency radio oscillations, an impedance bridge, means for applying said oscillations across one diagonal of said bridge, a doublet aerial connected in one arm of said bridge, the other arms of the said bridge being adjusted so that the bridge is balanced when the aircraft is very distant from the ground, a rectifier arranged to be fed from the other diagonal of said bridge, an amplifying valve, means for feeding to a control electrode of said valve the output of said rectifier in such a manner that the anode current of the valve is a maximum when said bridge is balanced, and a current meter and a variable resistor connected in series in the anode-cathode circuit of said valve.

10. A blind landing device for use in an aircraft for indicating the distance of the aircraft from the ground when close to the ground, said device comprising a doublet aerial stretched along the wings of the aircraft, an impedance bridge, a transformer coupling said aerial to one arm of said bridge, an oscillator connected to feed high frequency radio oscillations across one diagonal of said bridge, means for balancing said bridge when the aircraft is very distant from the ground, a series tuned circuit forming the other diagonal of said bridge and resonant at the frequency of said oscillations, a first amplifier connected to be fed with a voltage derived from said series tuned circuit, an instrument for measuring the degree to which the bridge is out of balance, and a rectifier and a second amplifier connected in series between the output terminals of said first amplifier and said instrument.

11. A blind landing device for use in an aircraft for indicating the distance of the aircraft from the ground when close to the ground, comprising means for generating high frequency radio oscillations, an impedance bridge, means for applying said oscillations across one diagonal of said bridge, means connecting the wings of said aircraft to one arm of said bridge so that said wings radiate oscillations as a doublet aerial, the other arms of said bridge being adjusted so that the bridge is balanced when the aircraft is very distant from the ground, and an instrument connected in the other diagonal of the said bridge for measuring the out-of-balance current or voltage developed on the said other diagonal when the aircraft is close to the ground.

DOUGLAS MAX HELLER.

REFERENCES CITED

The following references are of record in the file of this patent:

UNITED STATES PATENTS

| Number | Name | Date |
| --- | --- | --- |
| 1,969,537 | Alexanderson | Aug. 7, 1934 |
| 1,987,587 | Drake | Jan. 8, 1935 |
| 1,987,588 | Drake | Jan. 8, 1935 |
| 1,991,892 | Fessenden | Feb. 19, 1935 |
| 2,020,347 | Ballantine | Nov. 12, 1935 |
| 2,022,517 | Patterson | Nov. 26, 1935 |
| 2,230,537 | Heuschmann | Feb. 4, 1941 |
| 2,323,076 | Paul | June 29, 1943 |